Feb. 5, 1946. O. H. SCHAAF 2,394,208
FILTER PANEL AND SEALING MEANS
Filed July 17, 1943 2 Sheets-Sheet 1

INVENTOR.
OLIVER H. SCHAAF
BY Hyde and Meyer
ATTORNEYS.

Feb. 5, 1946.  O. H. SCHAAF  2,394,208
FILTER PANEL AND SEALING MEANS
Filed July 17, 1943  2 Sheets-Sheet 2
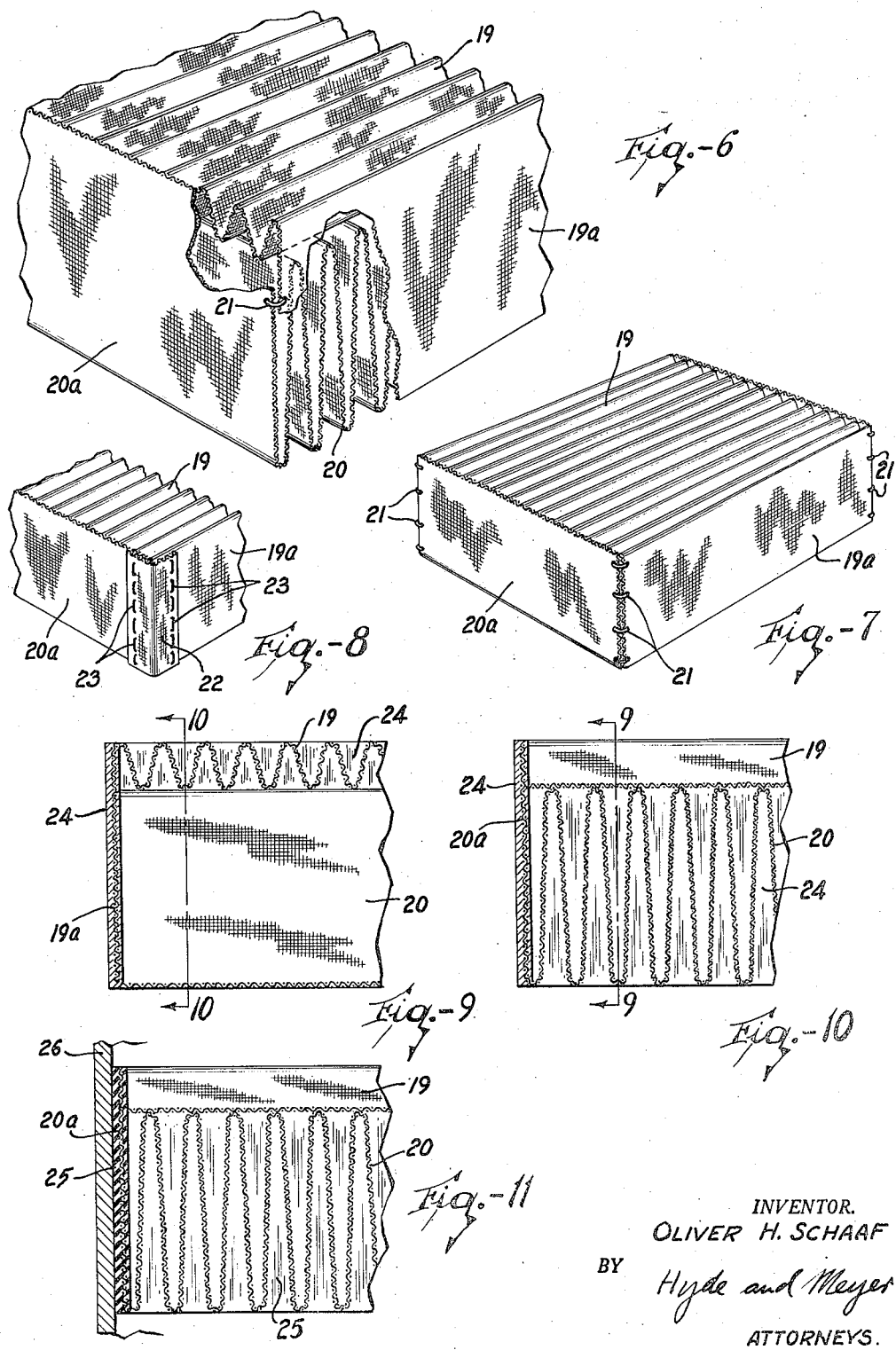
INVENTOR.
OLIVER H. SCHAAF
BY Hyde and Meyer
ATTORNEYS.

Patented Feb. 5, 1946

2,394,208

UNITED STATES PATENT OFFICE 2,394,208

FILTER PANEL AND SEALING MEANS

Oliver H. Schaaf, Chagrin Falls, Ohio, assignor to Air-Maze Corporation, Cleveland, Ohio, a corporation of Delaware Application July 17, 1943, Serial No. 495,144

10 Claims. (Cl. 183—51)

This invention relates to improvements in filter panel construction and particularly to improvement in means for strengthening a filter panel, for holding the elements of the panel in position, and for preventing or obstructing by-pass flow of fluid around the edges of the panel.

The objects and advantages of my improved construction will be apparent from the accompanying drawings and specification and the essential features will be summarized in the claims.

In the drawings:

Fig. 6 is a fragmental perspective view of a filter panel formed according to my invention and adapted to be used without any additional frame means;

Fig. 7 is a reduced perspective view of the entire panel constructed according to Fig. 6;

Fig. 8 is a fragmental sectional view reduced in size showing a modification of the corner of a panel constructed according to Figs. 6 and 7;

Figures 2, 3:
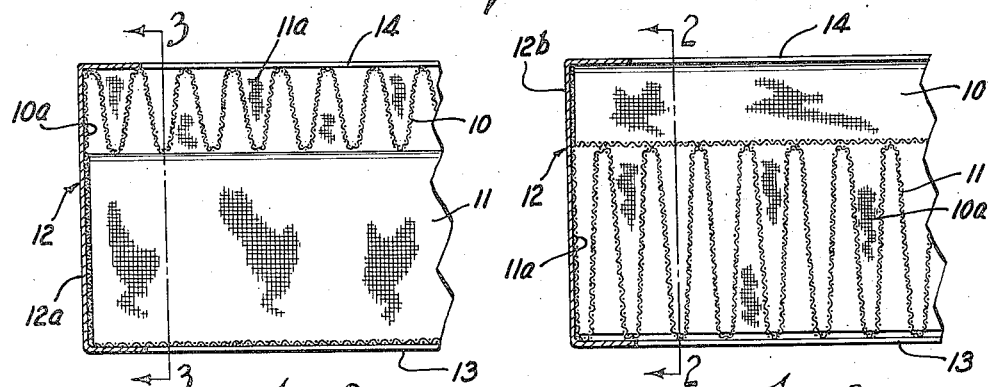
Fig. 2 is a sectional view taken along the line 2—2 of Fig. 1 and also the line 2—2 of Fig. 3.
Fig. 3 is a sectional view taken along the line 3—3 of Fig. 2.

Figs. 9 and 10 are views of another modification taken in position similar to Figs. 2 and 3 and showing a manner of casting a frame integral with the side screen portions of the filter, Fig. 9 being a sectional view along the line 9—9 of Fig. 10 and Fig. 10 being a sectional view along the line 10—10 of Fig. 9; while Fig. 11 is a view similar to Fig. 10 but showing another modification wherein the frame wall is cast around the side screen portion of the filter, and made of a different material.

Panels for filtering air and other fluids are constructed in many forms as to outside contour and as to the nature of the filtering layers and their arrangement. I have chosen, as illustrative only and in no sense as a limitation on my invention, a form of filter device rectangular in outer contour and comprising two layers of woven wire screen folded in crimps or corrugations. It will be understood that the layers of these filters are made of various forms of foraminate material arranged in a plurality of layers, the form and number of which vary within a wide scope.

Figure 1:
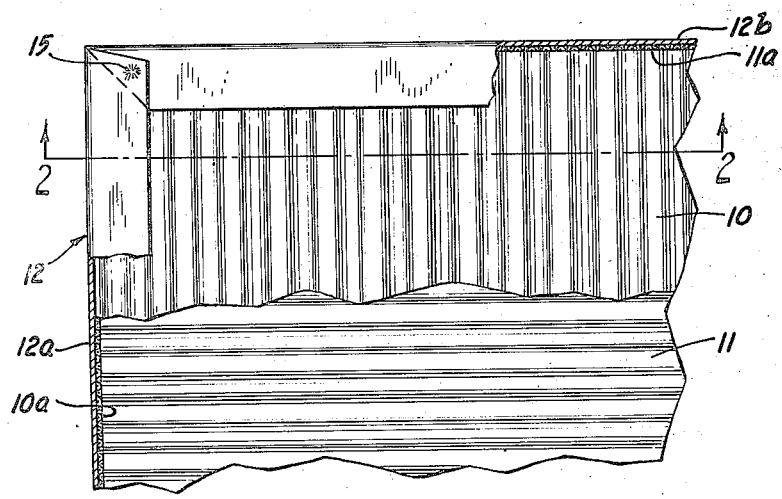
Fig. 1 is a partial plan view of a filter panel embodying my invention with parts broken away to more clearly show the construction.

In the filter panel shown in Figs. 1, 2 and 3, a layer 10 of crimped woven screen of wire or other filament material is superimposed upon and in contact with a similar layer 11 having deeper crimps. The plurality of layers form a filtering panel which is completed by means of a rectangular frame 12 which surrounds the filter layers on the sides and ends providing open front and rear faces 13 and 14 respectively so that air or other fluid may flow through the layers in sequence and is confined by the imperforate side walls of the frame, which closely embrace the layers of the filter. Referring to Figs. 1 and 2, the last fold 10a of the layer 10 adjacent the side 12a of the frame is extended between the open ends of the crimps of layer 11 and the frame side 12a, the fold 10a preferably extending entirely across the depth of the layer 11. Referring to Figs. 1 and 3, in like manner the last fold 11a of the layer 11 adjacent the frame extends between the frame side 12b and the open ends of the crimps of the layer 10. The other sides of layers 10 and 11 parallel to the folds 10a and 11a are treated in a similar manner, although not illustrated here. It results from this construction that when the parts are assembled in the frame, which is secured at the corners as by the spot welding indicated at 15, the layer 11 holds the folds 10a of the crimp 10 firmly in position, preventing the pulling of the crimps away from the frame, which would otherwise occur and which would permit by-passing of fluid along the inside face of the frame instead of compelling the fluid to flow through the layers of the panel in sequence. In a like manner, the layer 10 holds the folds 11a of the layer 11 in position, preventing the crimps of the layer 11 from pulling away from the frame sides.

In addition to the advantages pointed out in the preceding paragraph, the position of a layer of foraminate material such as 10a or 11a alongside the inner face of the flat frame side walls obstructs the by-passing of fluid at that place to such a high degree that it forms a very efficient sealing means. With the rectangular form of panel here illustrated, each of the layers forms such a sealing means for the other layer, resulting in a continuous sealing around the four sides of the frame. It will be obvious, however, that in other forms of my invention this arrangement for sealing along one or two sides of the frame might be utilized even if the arrangement of layers made it impossible to utilize the double sealing means illustrated at 10a and 11a. In such a case the sides of the frame which were not sealed by the use of my invention as here disclosed would either have to be left unsealed or might be sealed by some other means.

Figures 4, 5:
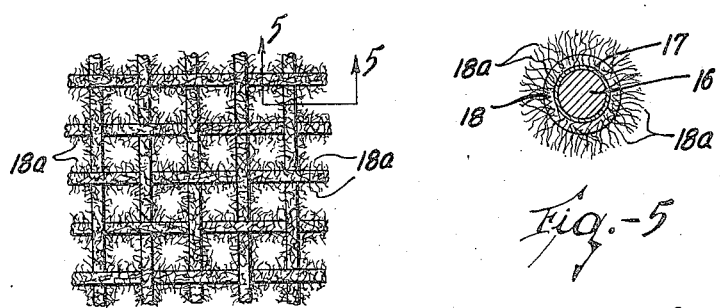
Fig. 4 is a greatly enlarged fragmental view of a portion of the screen used in Figs. 1 to 3.
Fig. 5 is a still further enlargement of a single strand of screen filament taken along the line 5—5 of Fig. 4.

The holding and sealing effects heretofore mentioned as advantages inherent in my invention are increased if the filaments of the wire screen are covered with a non-metallic material of a nature to enhance the sealing effects between the folds 10a and 11a on the one hand and the sides 12a and 12b of the frame on the other. Such covered or coated filaments have been illustrated in Figs. 4 and 5. One manner of coating the filaments is most clearly seen in Fig. 5, where the filament 16 is first given a coating 17 of varnish or other adhesive and a coating of finely comminuted material is then blown onto the screen, adhering to all parts of the surface of the filaments. Such a coating is sometimes provided by the use of cotton or rayon fibers individually measuring approximately $\frac{1}{16}$ to $\frac{1}{25}$ of an inch in length. Asbestos and other materials may be used for the same purpose. It is difficult to illustrate the nature of this filament covering because all parts of the surface of the filament are covered to some extent and the free ends of the comminuted material extend outwardly in all directions from the filaments so as to partly close the screen openings as illustrated in Fig. 4. Therefore in Fig. 5 I have illustrated a more or less solid layer of coating material 18 with the fibrous ends 18a extending outwardly.

Another manner of covering the filaments of the screen is illustrated in the copending application of Clarence J. Glanzer, Serial No. 441,067, filed April 30, 1942. It will be understood that the screen material coated as herein illustrated and described will give a better holding effect preventing the crimps from pulling away from the sides of the frame and will also provide a better sealing effect, preventing by-passing of fluid along the inside faces of the frame.

In addition to the other advantages described above there is an additional advantage in a rectangular filter of a plurality of layers having parallel folds 11a on two sides and parallel folds 10a on opposite sides wherein the folds of one layer closely embrace the open ends of the crimps of the other layer. As will be apparent from Figs. 2 and 3, this gives a construction where all four sides of the filter are enfolded in lengths of material which form an integral part of one or the other of the layers. This strengthens the entire panel so that it resists deformation such as would tend to change the rectangular shape to a trapezoidal one. Thus, by its constructional features my invention provides several improvements in the same panel. At the same time it is inexpensive to construct and to assemble.

In the forms of my device shown in Figs. 6, 7 and 8, two crimped layers of screen 19 and 20 respectively have the outside folds of each layer 19a and 20a respectively extending across the open ends of the crimps of the other layer like the previously described forms. Here, however, the outside folds have been so secured together that the device forms a complete panel without any frame means being provided other than the folds 19a and 20a previously mentioned. This may be done by securing the outside folds to each other and if necessary securing the fold of one layer to the crimps of the other layer so that the entire panel is bound together and may be put into a duct in that fashion. The connecting means shown in the drawings includes staples or ties 21 at the corners of the panel. It will be understood that the wire screen of which the panels of Figs. 6 and 7 are made may be plain or may be cloth covered in one fashion or another. If they are covered with cloth or other non-metallic material, then this material on the outermost faces 19a and 20a will aid in sealing the panel into a duct or other holding frame so as to prevent the flow of air or other fluid around the outer edges of the panel.

In the modification shown in Fig. 8 the layers 19 and 20 are arranged in the manner already described in connection with Figs. 6 and 7 but reinforcing corners 22 are provided so as to strengthen the panel at these points. The corner shown in Fig. 8 is another piece of screen material stapled to the folds 19a and 20a by means of staples 23, but it will be understood that other corner reinforcing members come within the scope of my invention.

In the modifications shown in Figs. 9, 10 and 11, a panel formed according to Figs. 6, 7 and 8 and omitting securing means such as 21 and 23, if desired, may be dipped in a plastic or rubber composition or other similar flowable material, which may thereafter be allowed to harden either alone or by the addition of heat so that a frame 24 is cast in place, the same being reinforced by the outermost folds 19a and 20a of the layers 19 and 20 respectively. It will be understood that preferably the frame means 24 will form a continuous strip of material around the four edges of the filter element.

In the modification of Fig. 11 the frame means 25 is formed in position with the folds 19a and 20a embedded in the frame means so as to tie the parts together and to reinforce the frame and to prevent all leakage of fluid around the end edges of the crimped layers. The difference between Fig. 11 and Figs. 9 and 10 is that the material 25 is of rubber or the like, which need not necessarily be cured to a hardened condition but which may be left sufficiently resilient and yielding so that when the filter panel is placed in a duct or holding frame, such as is indicated partially at 26, the material 25 may be slightly compressed so as to form a tight seal between the holding member 26 and the filter panel itself.

What I claim is:

1. In apparatus of the class described, two layers of foraminate material each folded to provide a series of parallel crimps, one of said layers superimposed upon the other with the crimps of one layer at right angles to the crimps of the other layer, a rectangular frame closely surrounding said layers along the sides and ends of said crimps, said frame having each of its sides extending generally parallel to the crimps of one layer and across the open ends of the crimps of the other layer, and the last fold of each layer adjacent a frame side extending between the frame and the open ends of the crimps of the other layer and flat against the frame side, whereby fluid flow along all of the sides of said frame is obstructed and the crimps of each layer are held against pulling away from the frame sides.

2. Apparatus as in claim 1 wherein each of said layers comprises a sheet of screen material having filaments covered with non-metallic material adapted to form a seal against said frame.

3. In filter apparatus of the class described, a plurality of layers of foraminate material arranged generally parallel to the plane of the open front face of the filter, at least one of said layers being folded to form a series of parallel crimps, a frame for directing a fluid stream through said layers, said frame having sides parallel to said crimps, the last fold of said one layer adjacent a frame side extending along the inside face of said frame side and past another of said layers, said other of said layers being so formed as to hold said last fold against said inside face of said frame, whereby to obstruct the flow of fluid parallel to said frame side at that place while holding said crimped layer in place.

4. In filter apparatus of the class described, a plurality of layers of foraminate material arranged generally parallel to the plane of the open front face of the filter, at least one of said layers being a sheet of woven screen having the filaments of the screen covered with non-metallic material adapted for sealing contact with a contiguous surface, said screen layer being folded to form a series of parallel crimps, a frame for directing a fluid stream through said layers, said frame having sides parallel to said crimps, the last fold of said one layer adjacent a frame side extending along the inside face of said frame side and past another of said layers, said other of said layers being so formed as to hold said last fold against said inside face of said frame, whereby to obstruct the flow of fluid parallel to said frame side at that place while holding said crimped layer in place.

5. In filter apparatus of the class described, a plurality of layers of woven screen material having screen filaments covered with non-metallic material adapted for sealing contact with a contiguous surface, said layers being arranged generally parallel to the plane of the open front face of the filter, two of said layers being folded to form parallel crimps in series, the crimps of one of said two layers extending at right angles to the crimps of the other of said two layers, a rectangular frame closely surrounding the edges of said layers and open at front and rear so as to direct fluid flow through said layers, said frame having flat inner faces extending parallel to said crimps, and the folds of said two layers adjacent said frame faces extending along the adjacent frame face and past another of said layers, whereby to obstruct the flow of fluid parallel to said frame face there while holding said crimps against pulling away from said frame.

6. In apparatus of the class described, two layers of foraminate material each folded to provide a series of parallel crimps, one of said layers superimposed upon the other with the crimps of one layer at right angles to the crimps of the other layer, the outside folds of each layer extending across the open ends of the crimps of the other layer, and means holding said outside folds in place.

7. In apparatus of the class described, two layers of foraminate material each folded to provide a series of parallel crimps, one of said layers superimposed upon the other with the crimps of one layer at right angles to the crimps of the other layer, the outside folds of each layer extending across the open ends of the crimps of the other layer, and means securing said outside folds in position so as to firmly bind the four outside folds together.

8. In apparatus of the class described, two layers of foraminate material each folded to provide a series of parallel crimps, one of said layers superimposed upon the other with the crimps of one layer at right angles to the crimps of the other layer thus forming a rectangular panel the outside folds of each layer extending across the open ends of the crimps of the other layer, a holding member having walls parallel to said outside folds, and said outside folds being embedded in plastic material extending in a continuous band around the four sides of the panel formed by said two layers, said plastic band being parallel to and adapted to fit snugly against the walls of said holding member.

9. A filter panel formed of foraminate material having outside folds of said material extending generally in planes parallel to the direction of fluid flow through said panel when in use, a frame of plastic composition coating said foraminate material so that said foraminate material is bound in said frame, a holding member having walls parallel to said outside folds, and said plastic frame being parallel to and adapted to fit snugly against the walls of said holding member.

10. In apparatus of the class described, two layers of foraminate material each folded to provide a series of parallel crimps, one of said layers superimposed upon the other with the crimps of one layer at right angles to the crimps of the other layer, the outside folds of each layer extending across the open ends of the crimps of the other layer and providing a rectangular filter, and a continuous strip of plastic material extending around the four sides of said filter and impregnating the outside folds of both layers, whereby said plastic material provides a frame around the four sides of the filter for the full depth of both layers and said outside folds reinforce the plastic material.

OLIVER H. SCHAAF.